United States Patent [19]

Bouhier et al.

[11] Patent Number: 5,199,691
[45] Date of Patent: Apr. 6, 1993

[54] HYDRAULIC ANTI-VIBRATION SLEEVES

[75] Inventors: Bernard Bouhier, Vierzon; Jean Thelamon, Bonneval, both of France

[73] Assignee: Hutchinson, Paris, France

[21] Appl. No.: 789,850

[22] Filed: Nov. 12, 1991

[30] Foreign Application Priority Data

Nov. 13, 1990 [FR] France ................... 90 14056

[51] Int. Cl.⁵ ............................................. F16F 13/00
[52] U.S. Cl. .................... 267/140.12; 267/220
[58] Field of Search ............... 267/140.1 C, 140.1 R, 267/140.5, 141.1, 141.2, 141.5, 141.6, 141.7, 35, 219, 140.12, 140.11; 248/562, 636

[56] References Cited

U.S. PATENT DOCUMENTS

| | | | |
|---|---|---|---|
| 4,702,346 | 10/1987 | Uno et al. | 267/140.1 R X |
| 4,763,884 | 8/1988 | Matsui et al. | 267/140.1 C |
| 4,840,359 | 6/1989 | Hamaekers et al. | 267/141.2 |
| 4,895,353 | 1/1990 | Roth et al. | 267/35 X |
| 4,896,868 | 1/1990 | Thelamon et al. | 267/219 |
| 4,962,915 | 10/1990 | Thorn | 267/140.5 |
| 5,013,012 | 5/1991 | Jouade | 267/140.1 C |
| 5,040,774 | 8/1991 | Veverka et al. | 267/140.1 C |
| 5,098,072 | 3/1992 | Muramatsu et al. | 267/140.1 C |

Primary Examiner—Matthew C. Graham
Attorney, Agent, or Firm—Larson and Taylor

[57] ABSTRACT

A hydraulic anti-vibration sleeve includes two coaxial rigid tubular membvers that are interconnected by an elastomer body (3) which co-operates therewith to form two diametrically opposite watertight pockets that intercommunicate via a narrow channel (Z), both pockets and the channel being filled with a liquid, the axial section of the portion of the body defining one of the pockets being U-shaped or V-shaped and open radially outwards, and being bonded to two rigid annular section members (8, 9), with the axially central portion of the body forming two radial arms (6). The narrow channel (Z) comprises, in series: two lengths (10, 11) belonging to respective ones of the two annular section members (8, 9); and a connection (12) interconnecting the two lengths and axially disposed at the outside edge of one of the radial arms (6).

6 Claims, 2 Drawing Sheets

HYDRAULIC ANTI-VIBRATION SLEEVES

The invention relates to hydraulic anti-vibration sleeves comprising two rigid tubular members disposed one inside the other and preferably constituted at least in part by bodies of revolution that are coaxial and concentric, at least under load, which members are interconnected by an elastomer body shaped so as to co-operate therewith to form at least two watertight pockets which are diametrically opposite in a direction D and which communicate with each other via a narrow channel, both of said pockets and said channel being filled with a damping liquid.

Such sleeves are designed to be mounted between two rigid parts fixable to respective ones of the two tubular members and liable to be subjected to oscillations relative to each other in the diametrical direction D, the assembly being arranged in such a manner that for at least some of such oscillations the liquid is expelled alternately from one of the pockets towards the other and vice versa through the narrow channel, thereby creating a resonance phenomenon in said liquid at a given oscillation frequency, with the value F of the frequency being directly related to the dimensions of said channel and with the resonance phenomenon being suitable for damping the transmission of said oscillations from one of the tubular members to the other.

Sleeves of this kind are designed, for example, to be interposed between the chassis of a vehicle and its internal combustion engine, or between the chassis and its front or rear axle assemblies.

In the context of the above sleeves, the invention relates more particularly to those in which firstly the portion of the elastomer body that delimits at least one of the pockets being generally U-shaped in axial section and being open radially outwards, which portion is bonded to two rigid annular section members which have the same axis as the axis of the outer tubular member and which are disposed inside respective ones of the two axial ends of said tubular member in the vicinity of said ends, at least one of said two section members containing the above narrow channel, and in which secondly the axially central portion of the elastomer body is in the form of two arms which extend radially between the two tubular members and parallel to the axes of these two tubular members.

Such sleeves are described in European patent 0 248 714 (or U.S. Pat. No. 5,013,012).

In known embodiments of said sleeves, the narrow channel is either:

single and constituted by a portion of at least one of the two annular section members; or else twin, i.e. comprising two parallel lengths belonging to respective ones of the two annular section members.

Under such conditions, the ratio R of the length of the single narrow channel (or of each of the components of a twin channel) divided by its width or its equivalent diameter is relatively low, namely less than 100, in general.

In some applications, it is desirable to increase the ratio R while retaining a sufficiently large value for the equivalent diameter of the narrow channel to ensure that the mass of liquid involved in the resonance phenomena that provides damping remains high enough.

This occurs, for example, when it is desired to provide effective damping of low frequency oscillations such as those in the range 5 Hz to 20 Hz that are generated on a vehicle running over irregularities in the road (choppiness).

To this end, advantage is taken of the fact that two annular section members are available in the mounts in question, and both of them are used in making up the "column" of liquid that is used for providing damping.

To this end, according to the invention, sleeves of the type in question are essentially characterized in that the narrow channel comprises, in series: two lengths belonging to respective ones of the two annular section members; and a connection interconnecting said two lengths and extending axially along the outside edge of one of the two radial arms constituting the elastomer body.

In advantageous embodiments, use is made of one or more of the following dispositions: the two annular section members and the connection together form a rigid cylindrical cage which is fixed to the outer tubular member with the connection constituting a bar of the cage;

the cage is constituted by two axially juxtaposed halves;

the openings of the narrow channel opening out into the two pockets are disposed close to the connection and angularly on opposite sides of the connection;

the connection runs smoothly into each of the annular lengths so as to avoid any sudden change in liquid flow direction; and the narrow channel is defined over its entire length by a single pipe that is curved and bent.

In addition to these main dispositions, the invention includes various other dispositions which are preferably used together therewith and which are explained in greater detail below.

An embodiment of the invention is described below with reference to the accompanying drawings, and naturally this is done in a manner which is not limiting.

FIGS. 1 and 2 of the drawings show a hydraulic anti-vibration sleeve in accordance with the invention, respectively in axial section on I—I of FIG. 2 and in cross-section on II—II of FIG. 1.

Figure 1:
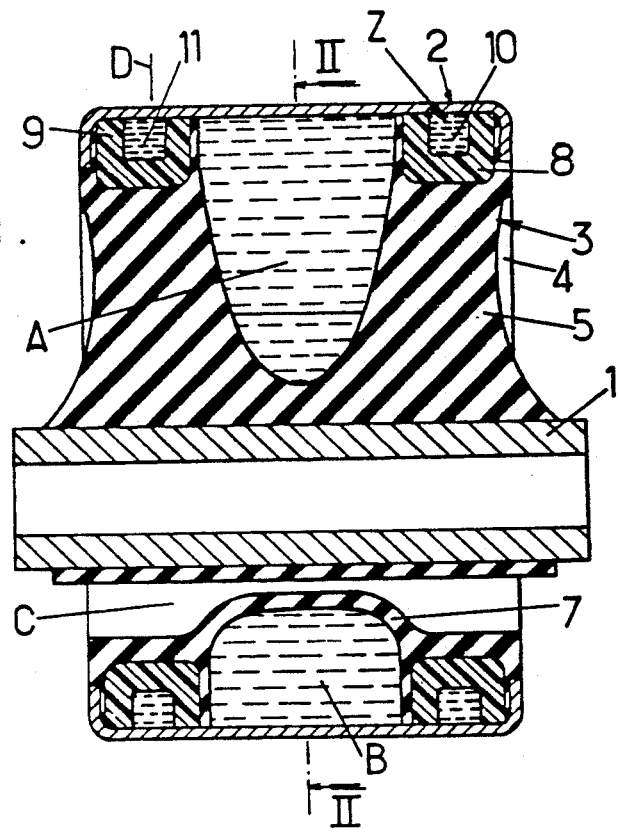

The sleeve in question comprises:

a circularly symmetrical inner tubular member 1 made of metal;

a circularly symmetrical outer tubular member 2 made of metal, surrounding the member 1 and which, when the sleeve is mounted and under load, may be coaxial with the member 1, and in any event the axes of the two tubular members being parallel when the sleeve is at rest; and an elastomer body 3 interconnecting the two tubular members 1 and 2 and forming two watertight pockets A and B therebetween which are diametrically opposite each other in a direction D.

The inner tubular member 1 is designed to be fixed to a pin (not shown) which fits therein and which passes therethrough, while the outer tubular member 2 is designed to be fixed to a bearing (not shown), with the pin and the bearing being themselves respectively fixed to two rigid items between which an anti-vibration mount is to be installed, which items may be the engine of a vehicle and the chassis of the vehicle.

A portion 3 of the body which, purely by way of example, is assumed herein to be its top half, is, under load, circularly symmetrical in shape about the common axis of the two tubular members 1 and 2 with an axial half-section that is U-shaped or V-shaped, and with two shallow grooves 4 that open axially towards the outside of the sleeve being formed in the two end walls 5 of said portion.

Figure 2:
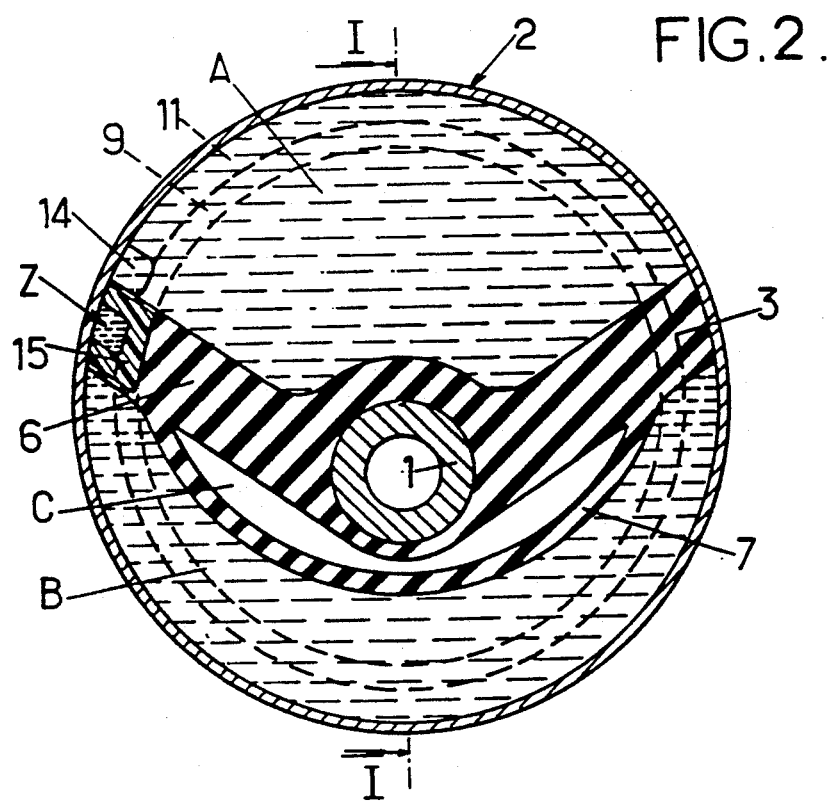

This portion also includes two radial arms or webs 6 extending parallel to the axes of the tubular members and diametrically opposite each other or else extending in a flattened V-shape as can be seen in FIG. 2, which arms cooperate with the walls 5 and the outer tubular member 2 to define the chamber A.

The portion of the body 3 that defines the chamber B is constituted by a thin flexible membrane 7.

This membrane is in the form of a band that is curved around a semicircle and that bulges slightly towards the axis. The band has two semicircular edges connected in watertight manner to the outer tubular member 2, and the two circumferential ends of said band are connected to the radial arms 6, thereby forming a pocket C between the arms and the membrane 7, which pocket opens out axially to the surrounding air.

The portions of the elastomer body 3 that correspond to the ends of the two arms of the U-shape or V-shape are bonded to two circular section members 8 and 9 of channel-shaped right cross-section, which section members are open radially outwardly.

These section members are covered in watertight manner by the axial ends of the outer tubular member 2 so as to form two narrow circular channels 10 and 11.

In this case, instead of being independent from each other as in prior embodiments, the two channels 10 and 11 are connected together in series by an intermediate connection 12 thereby forming a relatively long single channel Z.

The connection 12 extends parallel to the axes of the tubular members along the outer edge of one of the two radial arms or webs 6.

The entire volume in each of the chambers A and B within the central portion of the outer tubular member 2 is thus left unoccupied, thereby leaving the sleeve free to move a considerable distance radially for any given outside diameter of the sleeve.

In addition, the general structure of the sleeve is not complicated in any way by the presence of said connection 12 which harmoneously extends the radial arm 6 along which it runs, being constituted mereby by a groove in said edge, for example, or else by a bar running along the end of said arm.

The two ends of the single channel Z open out into the two pockets A and B respectively via two orifices 13 and 14 formed through the two section members 8 and 9, respectively.

The chambers A and B and the channel Z interconnecting them are filled with a damping liquid, generally some type of antifreeze.

In the embodiment shown, the connection 12 is constituted by a rectilinear longitudinal bar 15 forming part of an open rigid cylindrical cage constituted by said bar and by the two annular section members 8 and 9.

The narrow channel Z is then constituted by a sequence of grooves and flutes formed in the outer cylindrical face of said cage, all of which are covered in watertight manner by the outer tubular member 2.

The longitudinal bar 15 is disposed along the outer edge of one of the two webs 6 of elastomer material, which web is bonded to said bar.

Figure 3:
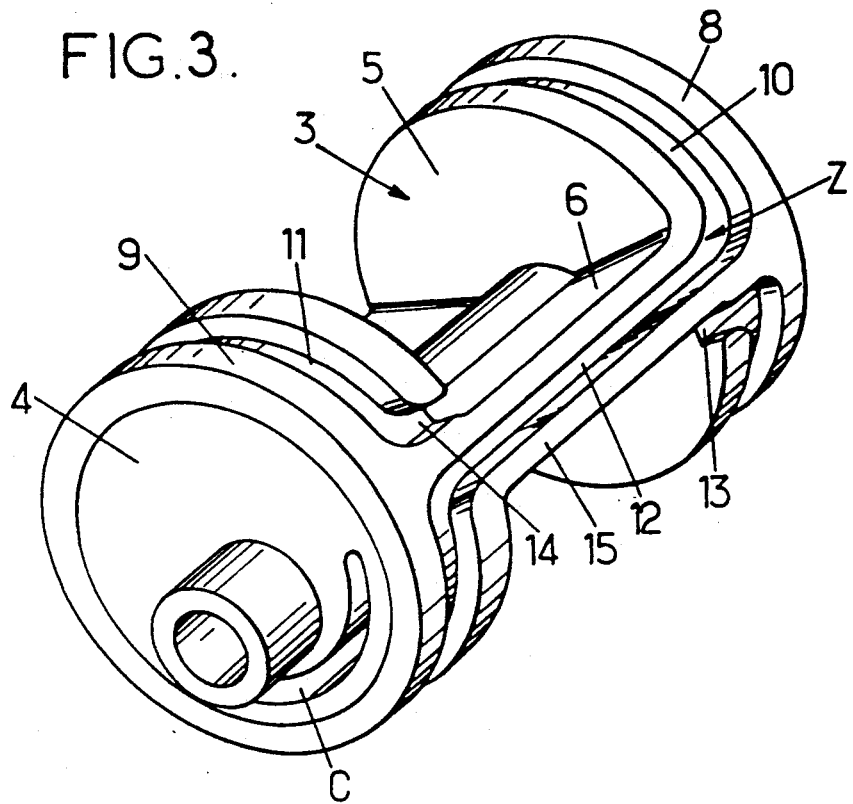
FIG. 3 is a perspective view of said sleeve with its outer tubular member removed.
Figure 4:
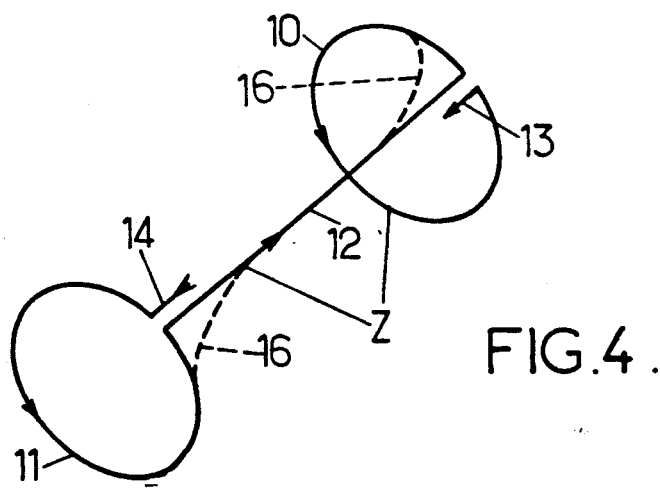
FIG. 4 is a diagram showing the path followed by the narrow channel included in the above sleeve.

As can be seen in FIGS. 2, 3, and 4, the openings from the narrow channel Z into the two chambers A and B are preferably angularly adjacent to the bar 15 and on opposite sides thereof such that each length of section member 8 and 9 in the channel Z extends over an arc of nearly 360° around the axis of the sleeve, thereby ensuring that the relative length of the channel Z is thus quite long.

This length can easily be more than twice as long as the length of ordinary single narrow channels.

In particular, if this length is written L and the equivalent diameter of the narrow channel in question is written D, then the ratio of said length L divided by said equivalent diameter D can be given a value which is much greater than 100, and which advantageously lies in the range 150 to 300.

As a result, the sleeves in question can be used to damp oscillations having a relatively low frequency, such as the oscillations that are imparted to a vehicle running over irregularities in the road (choppiness), which generally have a frequency lying in the range 5 Hz to 20 Hz.

Thus, regardless of the particular way in which it is made, a hydraulic anti-vibration sleeve is made available whose structure, operation, and advantages can be seen sufficiently from the above.

Naturally, and as already follows from the above, the invention is not limited to the specific applications and embodiments described more particularly; on the contrary, the invention extends to any variant, and in particular:

variants where, for the purpose of reducing the pressure losses to which the liquid flowing along the narrow channel is subjected, the central connection is designed to run smoothly into each of the annular lengths so as to avoid any sudden change in direction of liquid flow, in which case the bar forming a part of the open rigid cage is no longer rectilinear and longitudinal, but is inclined so as to reduce the connection angle between each of its ends and the adjacent annular length, or it may even be S-shaped as shown in dashed lines 16 in FIG. 4;

variants in which the open rigid cage is not constituted by a single piece, but is made up of two halves which may be identical or otherwise, which are juxtaposed axially and which are assembled together by molding the elastomer body; and variants in which the "annular section members" defining the two circularly arcuate terminal lengths of the narrow channel are made in a manner other than that described above and shown, for example their right cross-sections may be channel-shaped but open to the outside of the sleeve in the direction of the axis of its outer tubular member, with the groove defined by each circularly arcuate terminal length then being closed by a transverse flat washer applied axially thereagainst, or else their right cross-sections may be in the form of a continuous closed curve, in particular a circle, with the entire channel then being delimited by a single curved and bent pipe, for example.

We claim:

1. A hydraulic anti-vibration sleeve comprising:
    an outer rigid tubular member having a longitudinal axis and opposite axial ends;
    an inner rigid tubular member disposed inside of said outer tubular member;
    an elastomer body interconnecting said outer tubular member and said inner tubular member, said elastomer body being shaped and cooperating with said tubular members to form at least two diametrically opposite watertight pockets, said elastomer body including
- a) a first portion which delimits at least one of said pockets and which is generally U-shaped in axial section and open radially outward, and
- b) an axially central second portion in the form of two arms which extend radially between said tubular members and parallel to the longitudinal axis of said outer tubular member;

two rigid annular section members which are bonded to said first portion, said two rigid annular section members having an axis which is the same as the longitudinal axis of said outer tubular member and being respectively disposed inside and adjacent respective said opposite axial ends of said outer tubular member, a connection member provided axially along an outside edge of one of said arms;

a narrow channel which provides communication between said pockets, said narrow channel being formed of an end length in each of said annular section members and a connection length interconnecting said end lengths which said connection length extends axially along said connection member of said outside edge of the one of said radial arms of said axially central second portion; and a damping liquid which fills said pockets and said narrow channel.

2. An anti-vibration sleeve according to claim 1, characterized in that the two annular section members and the connection member in said outside edge of said radial arm together form a rigid cylindrical cage which is fixed to the outer tubular member with the connection member constituting a bar of the cage.

3. An anti-vibration sleeve according to claim 2, characterized in that the cage is constituted by two axially juxtaposed halves.

4. An anti-vibration sleeve according to claim 1, characterized in that there are respective openings of the narrow channel opening out into the respective two pockets, and said openings are disposed close to the connection member and angularly on opposite sides of the connection member.

5. An anti-vibration sleeve according to claim 1, characterized in that the connection length runs smoothly into each of the respective end lengths so as to avoid any sudden change in liquid flow direction.

6. An anti-vibration sleeve according to claim 1, characterized in that the narrow channel is defined over its entire length by a single pipe that is curved and bent.

* * * * *